United States Patent [19]

Goldberg

[11] 4,412,230

[45] Oct. 25, 1983

[54] APPARATUS AND METHOD FOR PRODUCING IMAGES ON A PHOTOSENSITIVE MEDIA

[75] Inventor: Paul R. Goldberg, Palo Alto, Calif.

[73] Assignee: Wavetek Indiana, Inc., Mountain View, Calif.

[21] Appl. No.: 303,876

[22] Filed: Sep. 21, 1981

[51] Int. Cl.³ .............................................. G01D 9/02
[52] U.S. Cl. ................................ 346/110 R; 340/799; 346/136; 358/348
[58] Field of Search .................... 346/110 R, 136, 1.1; 358/302, 348, 347, 346, 345; 340/799

[56] References Cited

U.S. PATENT DOCUMENTS 4,095,235  6/1978  Quarton ........................ 346/110 R
4,096,487  6/1978  Shafer ........................... 346/110 R Primary Examiner—Joseph W. Hartary
Attorney, Agent, or Firm—Flehr, Hohbach, Test, Albritton & Herbert

[57] ABSTRACT

Apparatus and Method for providing images on a photosensitive media is disclosed. The invention provides for the multi-point exposure correction of recorded grey scale hardcopy images which utilizes line by line attenuation of video data in a unique pattern. Also exposure compensation is provided for by decreasing the amplitude of the video signal, on a line by line basis, from a predetermined nominal value which is in the recording cathode ray tube's dynamic range. The invention thus performs its function without compromising the dynamic range of the recording mechanism.

14 Claims, 5 Drawing Figures

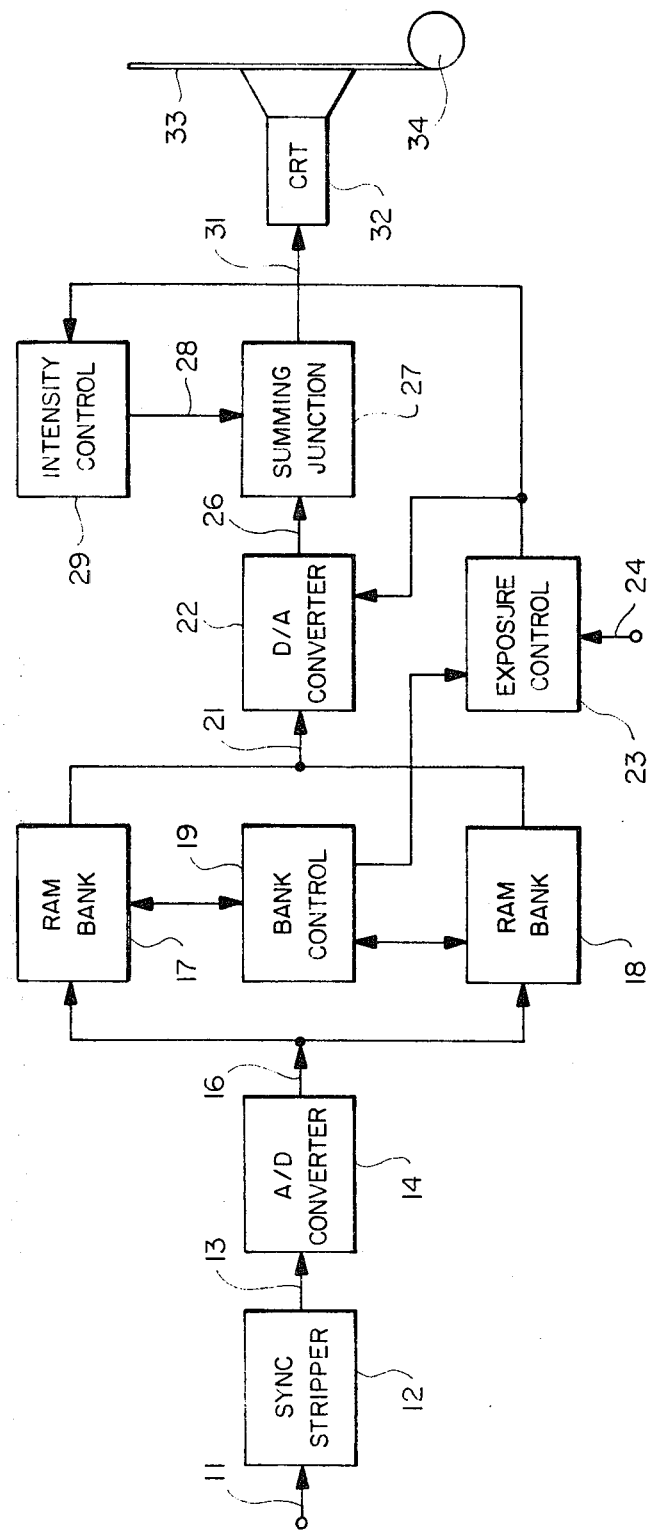

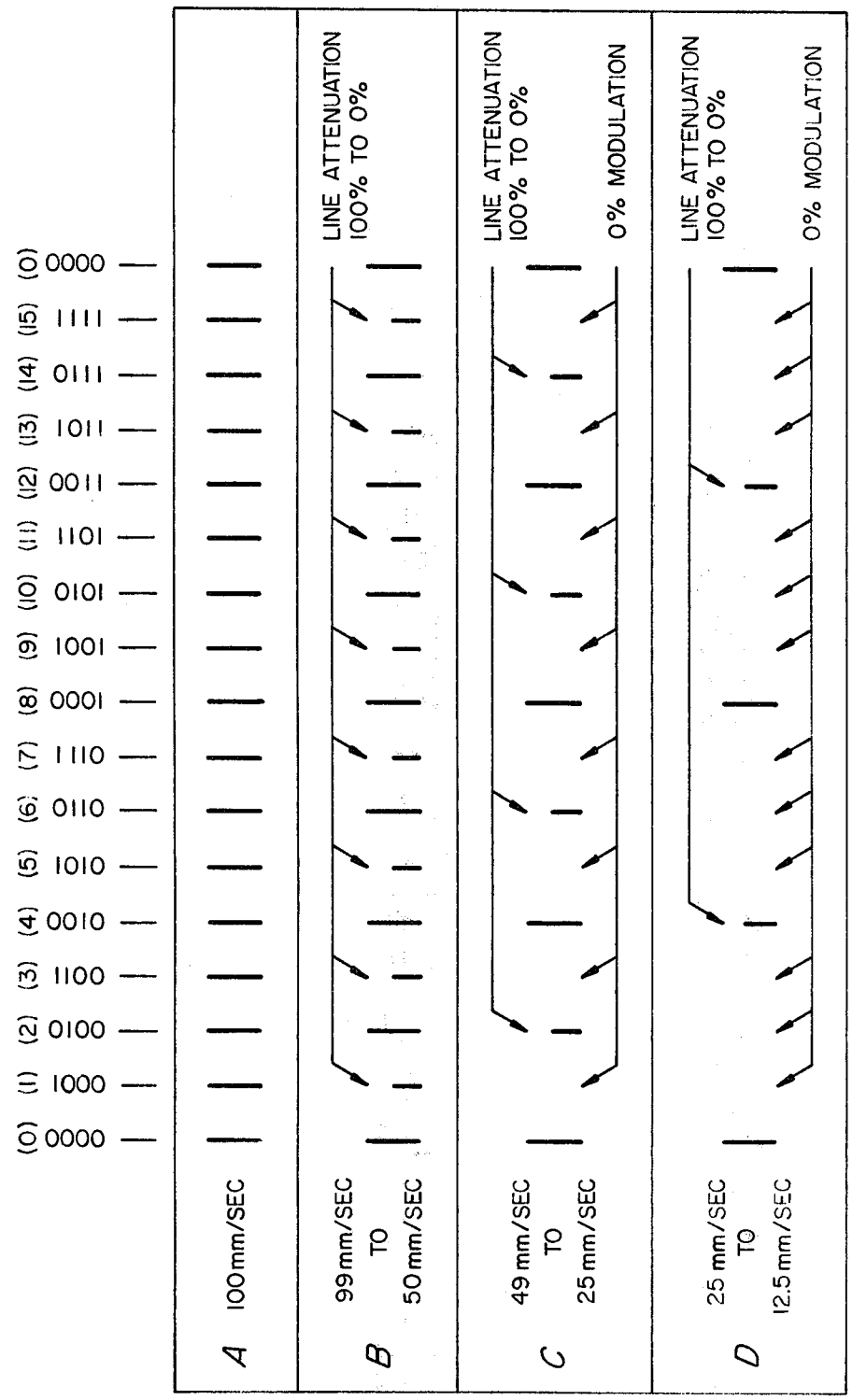

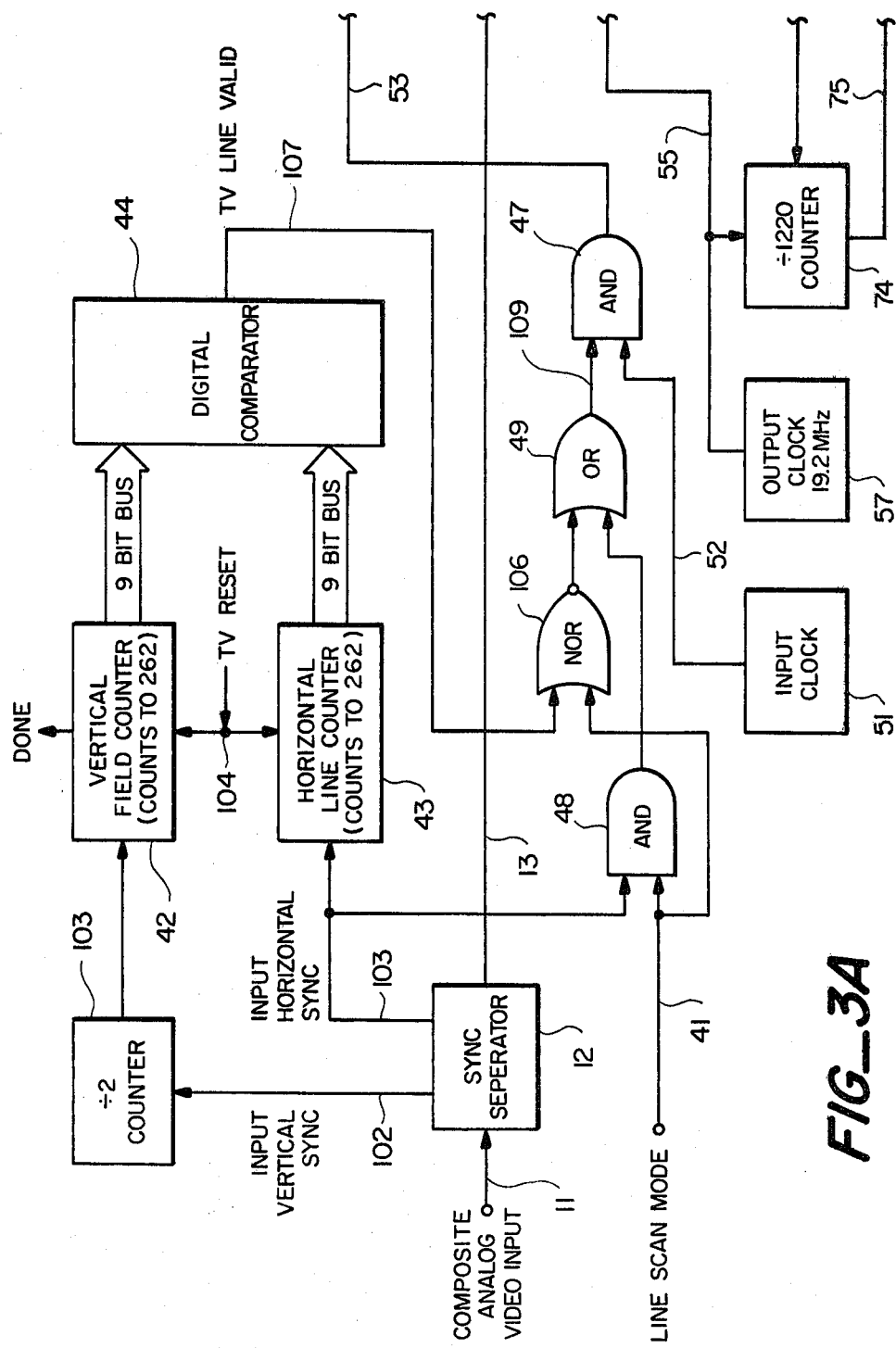
FIG_3A

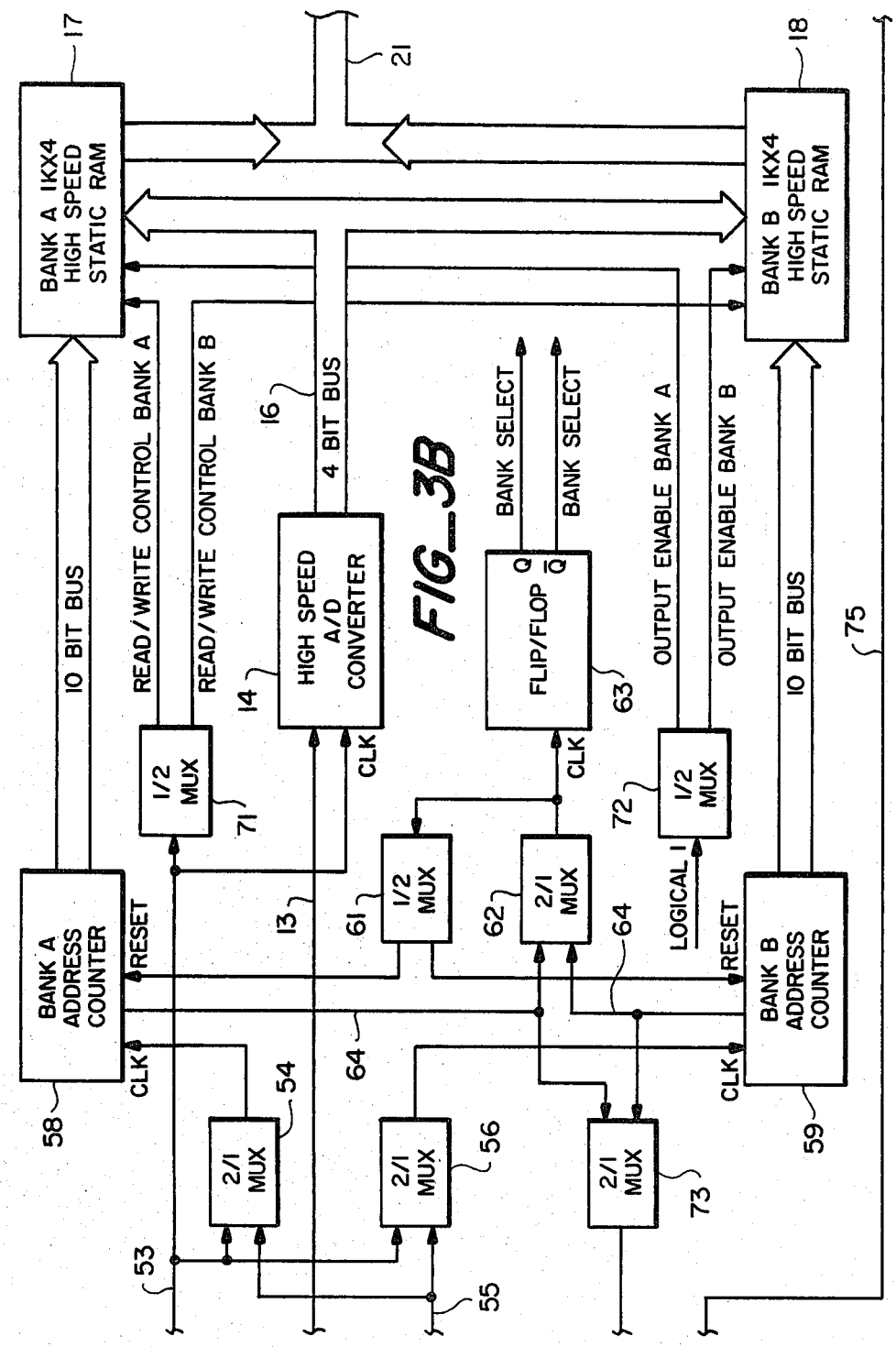
FIG_3B

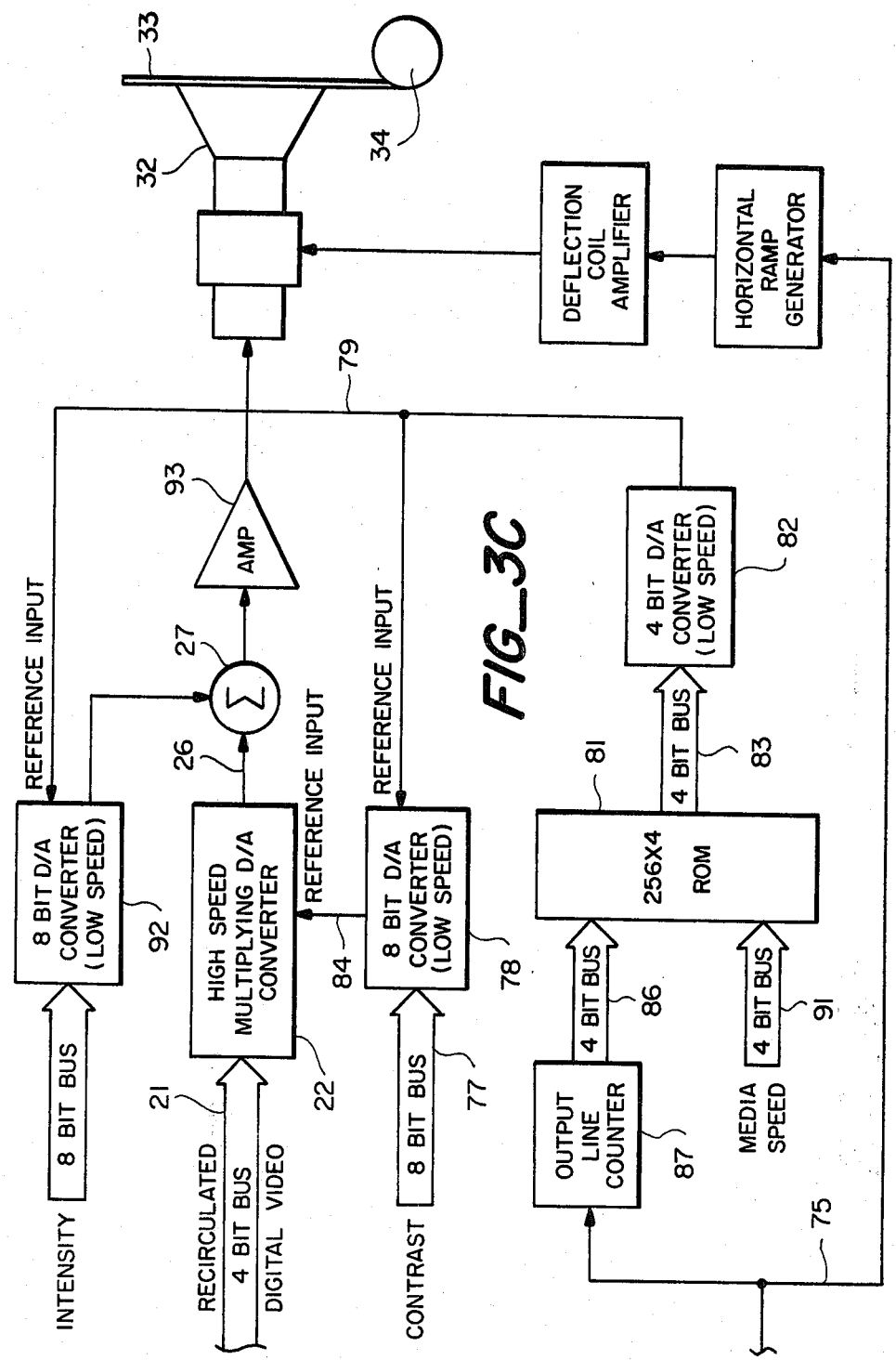

APPARATUS AND METHOD FOR PRODUCING IMAGES ON A PHOTOSENSITIVE MEDIA

This invention relates generally to an apparatus and method for processing analog video data and providing images on a photosensitive media. In particular, the invention relates to an apparatus and method in which image exposure is compensated without compromising the dynamic range of the recording system.

Graphic recorders for providing images and graphic displays of data signals are known. In such recorders graphic displays are produced from intermittently sampled data by providing the sampled data to the input of a cathode ray tube which is operated in a raster scan mode. In another related apparatus the graphic display is recorded on a photosensitive medium by operating a cathode ray tube in a line scan mode and continuously moving the photosensitive medium past the cathode ray tube. This provides a plurality of longitudinally spaced exposed lines along the medium to provide a grey scale hard copy display.

A difficulty with such hard copy apparatus has been that when the linear speed of the photosensitive recording media is changed, the exposure changes and the media is under or over exposed.

There are systems which compensate for different media speeds to thereby assure that the media is uniformly exposed. In one such system that exposure correction is by controlling the intensity of the cathode ray tube beam whereby the amount of light which reaches the photosensitive medium is increased or decreased. If the photosensitive media is caused to move past the recording cathode ray tube at a fast rate, for example, the resulting decrease in exposure is compensated for by increasing the beam intensity and therefore the nominal light output from the tube. A decrease in nominal light output is effected if the media velocity is decreased. Although this system achieves some compensation, it has two major drawbacks. First, the alteration of nominal light output of the tube places severe limitations on the light output range at which the cathode ray tube can be operated. A low sensitivity media, a high cathode ray tube deflection rate and/or a high media speed could easily require the cathode ray tube's light output to exceed the level at which high resolution images can be produced. Secondly, the requirement that the cathode ray tube's bias voltage be altered over a wide range for each new roll of photosensitive media and for each media speed chosen will shorten the cathode ray tube life.

A second method of achieving exposure compensation is by first converting incoming analog video data to digital format and then processing the digital data so that it reaches the cathode ray tube at a constant sweep rate. Thus, the cathode ray tube beam is required to sweep across the photosensitive medium at a constant rate regardless of the incoming rate of the original analog data. The cathode ray tube's sweep speed is chosen to allow high line density recording to be created at the fastest desired media speed. As the speed of the media is decreased, lines of data reaching the cathode ray tube are blanked in such a manner as to assure that the same number of lines are written per millimeter of paper irrespective of the speed of the recording medium. This causes the same amount of light to reach the media and, therefore, corrects the exposure. The difficulty with this prior art system is that the correction can only be achieved in multiples of two. For instance, if a top media speed of 100 mm/sec is chosen, the next point of correction can only be 50 mm/sec if a uniform line density per millimeter is to obtain. This would be accomplished by blanking or skipping every other line, thus writing the same number of lines per millimeter at the two different media speeds. Skipping three out of every four lines would correct for a media speed of 25 mm/sec. Compensation for other media speeds cannot be achieved. However, there are many occasions where it is desirable to record at media speeds which are not related to each other by multiples of two.

It is an object of the present invention to provide an improved method and apparatus for exposure correction of photosensitive recording media which overcomes the shortcomings associated with the aforementioned prior art systems.

It is another object of the present invention to provide an improved scan converter for forming images of video signals of the NTSC and PAL types on a photosensitive media.

The foregoing and other objects of the invention are achieved by an apparatus which converts each line of analog input to a digital data stream, applies the lines to a scan conversion means which provides a plurality of output lines of data for each input digital line, an analog to digital converter for receiving said output digital lines of data and converting them to analog lines of data, means for controlling the amplitude and intensity of selected analog output lines of data and a cathode ray tube for receiving and displaying said lines of data whereby the exposure of an associated photosensitive recording media is controlled.

The foregoing and other objects of the invention will be more clearly understood from the following description taken in connection with the accompanying drawings.

FIG. 1 is a block diagram showing the system of the present invention.

FIG. 2 is a diagram illustrating image exposure control in accordance with the present invention.

FIGS. 3A–3C are a detailed block diagram of a system in accordance with the preferred embodiment of the present invention.

Exhibit 1 is the program used in the photosensitive media speed correction read-only programmed memory.

The general operation of the apparatus and method for producing images on a photosensitive medium in accordance with the present invention will be more clearly understood with reference to the block diagram of FIG. 1. An input signal 11 such as a PAL or NTSC composite video signal, a sampled analog signal of a signal from scanning apparatus such as ultrasonic imaging apparatus is applied to sync stripper 12. In the case of PAL or NTSC composite signals the sync stripper will strip the horizontal and vertical sync pulses from the data and provide lines of analog signal at the input line 13 to the analog to digital converter 14. In the case of sampled analog signals or converted signals from scanning apparatus the sync stripper will strip the horizontal sync pulses (there are no vertical sync pulses present) and pass the lines of analog signals to the analog to digital converter. The analog to digital converter converts the analog signals to four bit digital words which appear on the bus 16. It will be apparent that the analog to digital converter may form other digital words such as eight or sixteen bit words. The four bit digital words from the bus 16 are selectively applied to high speed random access memory banks 17 and 18. A control 19, to be presently described in detail, serves to control the input and output from the random access memory banks 17 and 18. In operation an incoming line of image data is written into one of the memory banks for example memory bank 17 while the previous line of digital data stored in the other bank is read out at a constant much higher rate. For example each line of stored data is read out 16 times while one line of data is recorded in the other random access memory bank. This provides a scan conversion from one line rate to another constant line rate.

The output data from the data banks is applied along the bus 21 to a high speed multiplying digital to analog converter 22. The other input to the high speed multiplying digital to analog converter is a media speed analog signal which controls the amplitude of each converted scan line.

The analog signal is formed by an exposure control 23 which includes an input from the control 19 which identifies the lines of data output from the high speed random access memory bank 17 and 18 and a media speed input 24. The controller 23 includes a pre-programmed memory which serves to provide an output signal for each scan line which commands the high speed multiplying digital to analog converter and the intensity control 29 to control the amplitude and intensity of each repetitive line of data. The analog scan lines are applied along the line 26 to a summing junction 27 which has applied thereto an input signal, line 28, from the intensity control 29. This signal controls the amplitude offset from zero of the analog signals on line 31 which is the input to a scanning cathode ray tube 32. For example the scanning cathode ray 32 may be a fiberoptics cathode ray tube which is scanned at uniform velocity across the fiberoptics receptors to form repetitive lines of data on the face of the cathode ray tube. A photosensitive paper 33 is supplied from roll 34 and is drawn across the face of the tube and exposed by the transverse display lines of data.

In accordance with the present invention the gain and intensity of the scan lines is controlled to control the exposure of the photosensitive medium.

The foregoing will be more clearly understood with reference to FIG. 2 which schematically illustrates the simplified operation of the apparatus to effect compensation for changes of media speed in a sixteen line scan sequence. It will be understood that other line sequences can be used without departure from the present invention. At the top of the figure there are shown sixteen line sequences which represent the sixteen lines applied from each memory while an input line is being recorded in the other memory and which lines are applied to the cathode ray tube to form scan lines. With the photosensitive media travelling at maximum speed across the face of a cathode ray tube the gain control, the analog input to the multiplying digital to analog convertor, is set so that each line of information is applied to the cathode ray tube with full amplitude as shown at A, 100 mm/sec media speed. These sixteen scans expose the photosensitive media and are integrated. Then the next sequence of sixteen lines expose the photosensitive media and so on.

For a reduced media speed and the same scanning sequence the amount of light must be reduced to maintain the exposure. In accordance with the present invention selected scan lines are attentuated. Thus, for speeds between 99 mm/sec and 50 mm/sec alternate lines of analog data are attenuated. For example if the photosensitive media is travelling at 50 mm/sec then alternate lines are attenuated 100 percent. If the media is moving at 75 mm/sec the attenuation will be 50 percent while if the medium is moving at 100 mm/sec the attenuation is zero. This is illustrated at FIG. 2B, 99 mm/sec to 50 mm/sec. Similarly, for photosensitive media speeds between 25 mm/sec and 49 mm/sec alternate lines are completely attenuated and every third line amplitude is controlled between zero and 100 percent attenuation, FIG. 2C, 49 mm/sec to 25 mm/sec. For speeds between 12.5 mm/sec and 25 mm/sec every fifth line is attenuated, this is followed by three more fully attenuated lines, followed by an unattenuated line and the sequence repeated. This is shown graphically in FIG. 2D, 25 mm/sec to 12.5 mm/sec.

Although media speeds down to 12.5 mm/sec have been discussed the concept described is not limited to this range. Compensation for lower speeds are clearly practical by extending the attenuation scheme to every ninth line and beyond or as is shown in the program Exhibit 1 attenuating first and eighth data lines as well as the fifth data line between zero and 100 percent as a function of media speed below 12.5 mm/sec. Of course, the sequence of lines may have to be extended beyond sixteen lines to accommodate all speed variation, however, this presents no practical problem.

It should be noted that FIG. 2 does not illustrate the reduction in signal offset effectuated as a function of media speed. This intensity change is required in order to assure that the base exposure level applied to the photo-sensitive media is properly compensated.

Thus, there has been provided a system in which image exposure is compensated without compromise of the dynamic range of the recording media. The apparatus and method is capable of handling media having various sensitivities and traveling at any selected rate.

Referring to FIGS. 3A–3C there is provided a more detailed block diagram of the system shown in FIG. 1. Operation of this system will be more clearly understood by considering an example in which the analog input signal is in line scan format (a signal without vertical synchronization pulses).

When a signal with this characteristic is present on input line 11, scan mode logic line 41 is at a logical one thus effectively disabling vertical field counter 42, horizontal line counter 43 and digital comparator 44. Each horizontal sync pulse which appears on the output of sync separator 12 will be applied to the input of AND gate 47 through AND gate 48 and OR gate 49. This causes the pulses from input clock 51, applied to an input of AND gate 47 via line 52 to be gated on during the period of time that the input analog signal is normally unblanked and gated off during the period of time the input analog signal is normally blanked.

The gated input clock appearing on line 53 is connected to one input of digital multiplexers 54 and 56. The other input of digital multiplexers 54 and 56 is connected to output clock 57. These digital multiplexers are used to switch address counters 58 and 59 associated with random access memory banks 17 and 18 between the gated input clock signals appearing on line 53 and the output clock signal appearing on line 55. RAM banks 17 and 18 and address counters 58 and 59 comprise the major elements of a double buffered scan convertor. This system basically stores a line of input stripped analog video, appearing on line 13, which has been converted to four bit digital words by the action of high speed analog to digital converter 14 and plays it back at a fixed rate into high speed digital to analog converter 22. In order to do this without an interruption of output signal, RAM bank 18, for example, repetitively plays back previously acquired data until RAM bank 17 has recorded a full line of input data. The roles of the two RAM banks are then reversed such that the data just collected by RAM bank 17 is now played back repetitively until RAM bank 18 has stored the next full line of data. The rate at which the input data is written is determined by the gated input clock signal on line 53 which drives high speed analog to digital converter 14 clock input and the appropriate address counter 58, 59 through multiplexers 54, 56. The rate at which the output data is read back is determined by output clock 57 driving the appropriate address counter 58, 59 through line 55 and multiplexer 54 or 56. Multiplexers 61 and 62 in association with flip-flop 63 form the RAM bank selection system. First assume that RAM bank 17 is in the write mode and RAM bank 18 is in the read mode. Thus the carry bit output line of address converter 59, line 64 is connected to the reset line of address counter 58 through multiplexer 61 and 62 as well as to the clock input of flip-flop 63. When RAM bank 17 is full, carry output line 64 will pulse. This will reset RAM bank address counter 59 through multiplexer 61 and change the state of flip-flop 63. RAM bank 18 is now ready to accept new input data because its address counter 59 has been reset to 0 and RAM bank 17 can be read out because its address counter 58 has just indicated that it has reset itself to zero by issuing a carry bit. The change of state of flip-flop 63 causes the gated input clock to be applied, through multiplexer 56, to the RAM bank address counter 59 and the output clock signal is applied to RAM bank address counter 58 through multiplexer 54. In addition, the carry bit output line of address counter 59, line 64, is now connected to the reset line of address counter 58 because multiplexers 61 and 62 have been forced to switch states due to the fact that flip-flop 63 has switched states. This sets up the system so that it may once again interchange RAM bank read/write functions when RAM bank 18 has acquired the next full line of input data.

Three other digital multiplexers are required to totally reverse the read/write functions of the two RAM banks. These are multiplexers 71, 72 and 73. Multiplexer 71 is used to switch the gated input clock between the read/write control lines of RAM banks 17 and 18. This assures that the proper RAM bank is placed into the write mode when the incoming data to be stored is available at its data input lines. When a RAM bank is in its read mode its data input lines, which are connected to four bit digital bus 16 coming from high speed analog to digital converter 14, are inhibited, thus the data input lines of RAM bank 17 and 18 can be connected together as shown in FIG. 3.

Multiplexer 72 switches a logical zero to the output enable line of the RAM bank which is currently in the write mode. This allows the data output line of RAM banks 17 and 18 to be connected together to form single output bus 21 because the output of the RAM in the write mode is effectively disconnected from the output bus by this action.

Multiplexer 73 is used to direct the carry bit associated with the RAM bank currently in the read mode to the reset input of divide by 1220 counter 74. This assures that the 15750 Hz signal appearing on line 75, derived from output clock 57 by the action of divide by 1220 counter 74 is always properly synchronized with the data from the RAM bank which is currently being read. Since the signal on line 75 triggers the horizontal ramp generator, which ultimately deflects the electron beam of the recording fiberoptic cathode ray tube, the scanning electron beam will thus be driven so that it is synchronous with the data currently being read from the RAM bank in the read mode. This condition is required for the proper recording of the data on the photosensitive media.

In most cases the fixed scan rate digital output data read from the chosen RAM bank is repeated numerous times before the RAM bank roles are switched and new output data is transfered to output bus 21. The number of times the old data is read out from one RAM is determined by the length of time that is required to acquire the next line of data in the other RAM. Thus, if it takes 1016 microseconds to fully load the RAM bank accepting data and the output period is 63.5 microseconds (1/15,750), then the previous line data will be repeated sixteen times before it is refreshed. If a different fiberoptics cathode ray tube sweep rate is chosen or if the input data line rate is different, then the number of RAM re-reads, and hence data repeats on the fiberoptics cathode ray tube changes, but the concept remains the same.

Before the recirculated digital data is applied to the input of the recording cathode ray tube, it must first be converted back into analog form. It is during this process that exposure compensation is performed. In the preferred embodiment, four bit wide bus 21 carries the recirculated digital video to the input of high speed multiplying digital to analog converter 22. The amplitude, or gain characteristics of the analog signal leaving digital to analog converter 22 on line 26 is controlled by an eight bit wide digital contrast bus 77 through low speed digital to analog converter 78. The reference input 79 is generated by low speed ROM 81 through low speed digital to analog converter 82. This configuration allows overall signal path gain characteristics set by digital contrast bus 77 to be modulated by digital bus 83 from ROM 81 on a line by line basis. Digital bus 77 sets the overall signal path gain characteristics by establishing the nominal reference voltage on line 84, the reference input of high speed digital to analog converter 22.

The output of low speed ROM 81 is dependent upon the speed the media is drawn past the fiberoptic cathode ray tube and the particular number of the line in the sixteen line repetitive sequence which appears on four bit digital bus 86. This number, generated by output line counter 87 in conjunction with the output line sync signal which appears on line 75 starts at zero and proceeds toward fifteen. It changes in synchronism with the ending of each pass of recirculated digital data read from the RAM bank 17, 18 currently in the output mode.

Assume, for example, that the first line of the sixteen line gain sequence is being processed and the media is running at maximum speed, 100 mm/sec. At this point output line counter 87 is at count 0000. This information is relayed to low speed ROM 81 by four bit wide bus 86. The output of ROM on four bit wide bus 83 is determined by a program which has been burned into ROM 81. A copy of the program used in the preferred embodiment appears as the last page of the specification, Exhibit 1. With this program in place and the inputs to ROM 81 as just described high speed digital to analog converter 22 will be set through low speed digital to analog converter 78 so that the digital video signal appearing on four bit wide bus 21 is converted into an analog signal on line 26 which displays nominal gain.

On the occurrence of the next line of the sixteen line sequence of input digital video which appears on four bit wide bus 21, counter 87 output changes to 0001. However, since the signals appearing on four bit wide bus 91 indicate that the media is running at maximum media speed no exposure correction is needed. Therefore, the ROM is programmed such that its output on four bit digital bus 83 will not change and the gain displayed by high speed digital to analog converter 22 remains the same. This will be the case for all counter outputs, 0011 (three) through 1111 (fifteen) as long as the media speed remains at maximum 100 mm/sec. A graphical representation of this concept appears in FIG. 2A. Each short vertical stroke stands for a complete line of nominal unattenuated video.

When the media speed is reduced it is necessary to reduce the amount of light reaching the photosensitive media. As previously discussed the "line skipping" method utilized by some systems accomplishes this by blanking lines as the media speed is reduced. This only allows exposure compensation at speeds related to each other by multiples of two. Thus, if the maximum speed is 100 mm/sec., exposure correction could only be obtained for 50, 25, 12.5, 6.25, etc. mm/sec. In order to overcome this inherent deficiency the present invention attenuates the amplitude of selected lines of digital data. This is accomplished by changing the media speed value on four bit digital bus 91 and thereby using a different portion of the program which has been burned into ROM 81. This will cause the output of ROM 81 on four bit digital bus 83, to set the gain of high speed digital to analog converter 22 to a different value for selected lines dependent upon the value of the count from four bit line counter 87 and the exact media speed chosen on line 91. In the example under consideration the ROM is programmed to cause the gain of high speed digital to analog converter 22 to be reduced on alternate lines of the sixteen line sequence over the media speed range of 99 mm/sec to 50 mm/sec. Thus the four bit word on digital bus 83 for line count 0000 and all other even line counts would cause digital to analog converter 22 to exhibit no attenuation from nominal for even line counts and exhibit an attenuation between 0 percent and 100 percent depending on the media speed chosen for line count 0001 and all odd line counts. This is depicted in FIG. 2B.

For speed between 49 mm/sec and 25 mm/sec the apparatus and method under consideration attenuates from nominal every other line of digital data by a factor of 100 percent (zero output) and attenuates from nominal every third line of digital data from 0 percent to 100 percent. This is accomplished in the same manner as previously described, FIG. 2C. Speeds from 25 mm/sec to 12.5 mm/sec are exposure compensated in the same manner except in this case lines two, three and four are attenuated to zero with every fifth line attenuated from 0 percent to 100 percent. This sequence is followed by three more lines which are attenuated to zero with the fourth line in the series unattenuated, FIG. 2D.

Although only media speeds down to 12.5 mm/sec have been discussed, the concepts described are not limited to this range. Compensations for slower speeds are clearly practical by extending the attenuation scheme to every ninth line and beyond or as is shown in ROM program listing Exhibit 1, attenuating the first and eighth data lines as well as the fifth data line between 0 and 100 percent as a function of media speed below 12.5 mm/sec. Of course, the sequence of lines utilized by this function may have to be extended beyond sixteen lines but this presents no practical or theoretical limitations. It should be noted that the ROM contains 256 four bit words. This allows sixteen separate attenuation levels, a sixteen line attenuation sequence and compensation for sixteen preselected media speeds. If a ROM with a longer word is used, the system could display additional levels of attenuation. Likewise, if a ROM which stores more words is employed both the length of the line by line exposure compensation sequence as well as the number of individual media speeds at which exposure compensation could be effected would increase.

The offset voltage which sets the overall intensity of the light which emanates from the face of the fiberoptic cathode ray tube is established by eight bit digital to analog converter 92 through summing junction 27. This voltage is added to the exposure corrected analog video coming from the output of high speed digital to analog converter 22 before it is amplified by wide band video amplifier 93 and subsequently connected to fiberoptics cathode ray tube 32.

Reference input of 8 bit D/A converter 92 is connected to reference input 79 of 8 bit D/A convertor 78. Thus the base intensity of the fiber optics CRT is also modulated on a line by line basis as a function of Rom 81's output. This assures that the base exposure level applied to the photosensitive media is properly compensated for at each media speed.

As mentioned earlier the preferred embodiment of the system under discussion is configured to accept NTSC and PAL composite television signals as well as line scan input. The proper acquisition and processing of these television mode signals is accomplished through the use of vertical field counter 42, horizontal line counter 43 and digital comparator 44.

In order to record the incoming television video data in the correct line sequence it is necessary to realize that most television signals use an interlaced vertical scanning technique. That is each field of the television image represents only half of the data lines present in the complete image and that the first line in the first field, field A, is not followed by the second line of the television image. It is followed by the third. The second line of the television image appears as the first line of the subsequent field, field B. Thus, two succeeding fields are interdigitated. In order for the system under consideration to correctly record this interlaced signal it is necessary that the image be frozen for the entire recording process. All the lines of both fields will repetitively appear on line 11, the input of the system. This will allow line one from field A to be acquired followed by a 16.67 millisecond wait for a NTSC signal and a 20 millisecond wait for a PAL signal and then line two from field B to be acquired. The third line is acquired from the following repeat of field A and the fourth line is acquired from the following repeat of field B. The acquisition sequence just described continues until all 525 lines of an NTSC image or all 625 lines of a PAL image are captured.

Sync separator 12 strips the horizontal and vertical sync signals from the incoming TV input signals and place them on line 101 and 102 respectively. Horizontal line counter 43 employs the horizontal sync signal on line 101 to determine which horizontal line in a particular one of the 525 or 625 vertical fields required for the recording of the full TV image is currently appearing on the input. Vertical field counter 42 counts the number of the field from which the current line is being taken. Note that the vertical sync signal is divided by two by the action of divide by two circuit 103. This causes the vertical field counter to increment only on every other field. The reason for this will become clear shortly. The action of recording a TV image begins after line scan mode line 41 is in a logical low state and both the vertical field and horizontal line counters have been reset to zero by a signal on TV reset line 104. The logical low on line scan mode line 41 enables the TV image acquisition system by preventing AND gate 48 from transferring the horizontal sync signal on line 101 to the input of OR gate 49 and by allowing NOR gate 106 to pass TV line valid signal on line 107 through OR gate 49 and onto the input of AND gate 47. At this point digital comparator 44 senses a comparison and causes by the route just described input enable line 109 to rise. This turns on the gated input clock signal which appears on line 53 and, in the same manner as described for the capture of a line of line scan mode signal, causes the writing of the first line of input TV data in the appropriate RAM bank. At the occurance of the next horizontal line, horizontal line counter 43 updates its count and, because vertical field counter 42 is still at count zero, the TV valid line signal on line 107 from digital comparator 44 goes off thereby shutting off the gated input clock. The action of shutting off the gated input clock places the scan conversion portion of the system into a hold mode in which it recirculates and writes to the fiberoptic cathode ray tube the horizontal line just acquired until a new line is available. The following 260 horizontal lines do not cause a comparison and thus the TV valid line remains low and no new line is recorded. On the occurance of the next field of TV video, vertical field counter 42 is not updated because of the action of divide by two circuit 103. Therefore, the first line from the next field causes a comparison and is sent through the system to be ultimately recorded on the photosensitive media by the recording fiberoptic cathode ray tube. Note that this line is really the second of the TV image and is recorded in the proper sequence as desired. When the next TV field occurs vertical field counter 42 is updated and a comparison will take place when the second line of the next TV field is present at the input of the system. This line will be written on the photosensitive media as the third line acquired, the order in which it actually appears in the TV image. The process described above continues until 525 or 625 lines have been written on the photosensitive media. At this point the carry bit of vertical field counter goes high and the TV image recording process is complete.

Thus, there has been provided an improved system for the multi-point exposure correction of recorded grey scale hardcopy images which utilizes line by line attenuation of video data in a unique pattern. Also because exposure compensation is provided for by decreasing the amplitude of the video signal, on a line by line basis, from a predetermined nominal value which is in the recording cathode ray tube's dynamic range, a system is provided which performs its function without compromising the dynamic range of the recording mechanism.

EXHIBIT 1

```
00010 REM             **** MEDIA SPEED GAIN ADJUSTMENT PROGRAM ****
00015 REM
00020 REM             THIS PROGRAM PROVIDES THE DATA REQUIRED TO
00022 REM             PROGRAM THE MEDIA SPEED GAIN ADJUSTMENT
00025 REM             (MSGA) PROM. IT IS COMPOSED ENTIRELY OF
00030 REM             ROMMABLE DATA WHICH CONFORMS TO THE MSGA
00035 REM             PROM MEMORY MAP OF 2/13/81.
00040 OPT H
00042 BASE =$30
00043 DIM A(1)
00045 ORG =$DFFD
00050 STACK =$FF : REM   THESE STATEMENTS ARE DIRECTIVES TO THE
00052 REM               A/BASIC COMPILER IN ORDER TO ALLOW IT
00053 REM               TO PROPERLY PROCESS THE STATEMENTS
00054 REM               BELOW.
00055 REM
00060 GEN $C,$0,$0,$0,$0,$0,$0,$0,$0,$0,$0,$0,$0,$0,$0,$0 : REM    MSGA 0
00065 GEN $C,$0,$0,$0,$C,$0,$0,$0,$C,$0,$0,$0,$C,$0,$0,$0 : REM    MSGA 1
00070 GEN $F,$0,$0,$0,$3,$0,$0,$0,$F,$0,$0,$0,$2,$0,$0,$0 : REM    MSGA 2
00075 GEN $F,$0,$0,$0,$A,$0,$0,$0,$F,$0,$0,$0,$9,$0,$0,$0 : REM    MSGA 3
00080 GEN $F,$0,$0,$0,$F,$0,$0,$0,$F,$0,$0,$0,$F,$0,$0,$0 : REM    MSGA 4
00085 GEN $F,$0,$8,$0,$F,$0,$1,$0,$F,$0,$8,$0,$F,$0,$1,$0 : REM    MSGA 5
00090 GEN $F,$0,$F,$0,$F,$0,$1,$0,$F,$0,$F,$0,$F,$0,$1,$0 : REM    MSGA 6
00095 GEN $F,$0,$F,$0,$F,$0,$9,$0,$F,$0,$F,$0,$F,$0,$8,$0 : REM    MSGA 7
00100 GEN $F,$0,$F,$0,$F,$0,$F,$0,$F,$0,$F,$0,$F,$0,$F,$0 : REM    MSGA 8
00105 GEN $F,$2,$F,$2,$F,$2,$F,$2,$F,$2,$F,$2,$F,$2,$F,$2 : REM    MSGA 9
00110 GEN $F,$4,$F,$4,$F,$4,$F,$3,$F,$4,$F,$4,$F,$4,$F,$3 : REM    MSGA 10
00115 GEN $F,$6,$F,$5,$F,$6,$F,$5,$F,$6,$F,$5,$F,$6,$F,$5 : REM    MSGA 11
00120 GEN $F,$8,$F,$7,$F,$8,$F,$7,$F,$8,$F,$7,$F,$8,$F,$7 : REM    MSGA 12
00125 GEN $F,$9,$F,$8,$F,$8,$F,$8,$F,$8,$F,$8,$F,$8,$F,$8 : REM    MSGA 13
00130 GEN $F,$B,$F,$B,$F,$B,$F,$B,$F,$B,$F,$B,$F,$B,$F,$B : REM    MSGA 14
00135 GEN $F,$F,$F,$F,$F,$F,$F,$F,$F,$F,$F,$F,$F,$F,$F,$F : REM    MSGA 15
00140 END
```

What is claimed is:

1. A system of the type forming line displays on line scan cathode ray tube for recording on a photosensitive medium moved past said cathode ray tube to form a graphic display on the photosensitive media which is exposed during each line display as the media is moved past the tube comprising storage means for storing signals corresponding to lines of input data means for reading each stored line of input data a plurality of times to provide a predetermined number of repetitive scan signals for each line of input data means forming a control signal which is related to media speed past the cathode ray tube means for receiving said repetitive scan signals and the control signal and controlling the amplitude of selected ones of said scan signals responsive to the control signal whereby to control the recording media exposure for each stored line of input data.

2. A system as in claim 1 including means for receiving said controlled amplitude line scan signals and controlling their amplitude.

3. A system as in claim 1 in which said input signals are analog signals including means for converting said lines of analog signals to digital signals, said storage means comprises a random access digital memory for storing converted lines of analog input data and said means for receiving said repetitive scan signals and control signals comprises a digital to analog converter.

4. A system as in claim 1 in which means for forming a control signal comprises means responsive to media speed.

5. A system as in claim 4 in which said means for forming a control signal includes a read only memory which is programmed to provide on a line by line scan line basis control signals whereby to control the amplitude of selected lines.

6. A system as in claim 1 in which storage means comprises first and second memory means and reading means is associated with each of said storage means, including means for controlling the application of lines of data signals to a selected storage means and reading from the other means to form scan signals whereby while data line signals are stored in one storage means the stored line signals in the other storage means are read a repetitive number of times.

7. A system as in claim 3 in which means for forming a control signal comprises means responsive to media speed.

8. A system as in claim 7 in which said means for forming a control signal includes a read only memory which is programmed to provide on a line by line scan line basis control signals whereby to control the amplitude of selected lines.

9. A system as in claim 3 in which storage means comprises first and second memory means and reading means is associated with each of said storage means, including means for controlling the application of lines of data signals to a selected storage means and reading from the other storage means to form scan signals whereby while data line signals are stored in one storage means the stored line signals in the other storage means are read a repetitive number of times.

10. A system as in claim 6 in which said means for forming a control signal includes a read only memory which is programmed to provide on a line by line scan line basis control signals whereby to control the amplitude of selected lines.

11. A system as in claim 10 in which said means for controlling application of signals to said storage means includes line counting means and said programmed read only memory is also responsive to said line count.

12. In a recording system of the type in which lines of data are recorded on a photosensitive media which is moved past a scanning cathode ray tube, the method of controlling exposure of said medium which comprises the steps of storing each line of input data in memory reading each line of input data from said memory a plurality of times to form scan lines controlling the amplitude of selected ones of said scan lines and applying said amplitude controlled scan lines of data to said cathode ray tube to thereby control said photosensitive media for each input line.

13. A recording system as in claim 1 in which said amplitude is controlled in response to the speed at which the media is drawn past the cathode ray tube.

14. A method as in claim 1 including the additional step of controlling the intensity of said scan lines after their amplitude has been controlled.

* * * * *